June 20, 1933.  A. L. STILES  1,914,760
TIRE CHAIN ATTACHMENT
Filed July 7, 1932
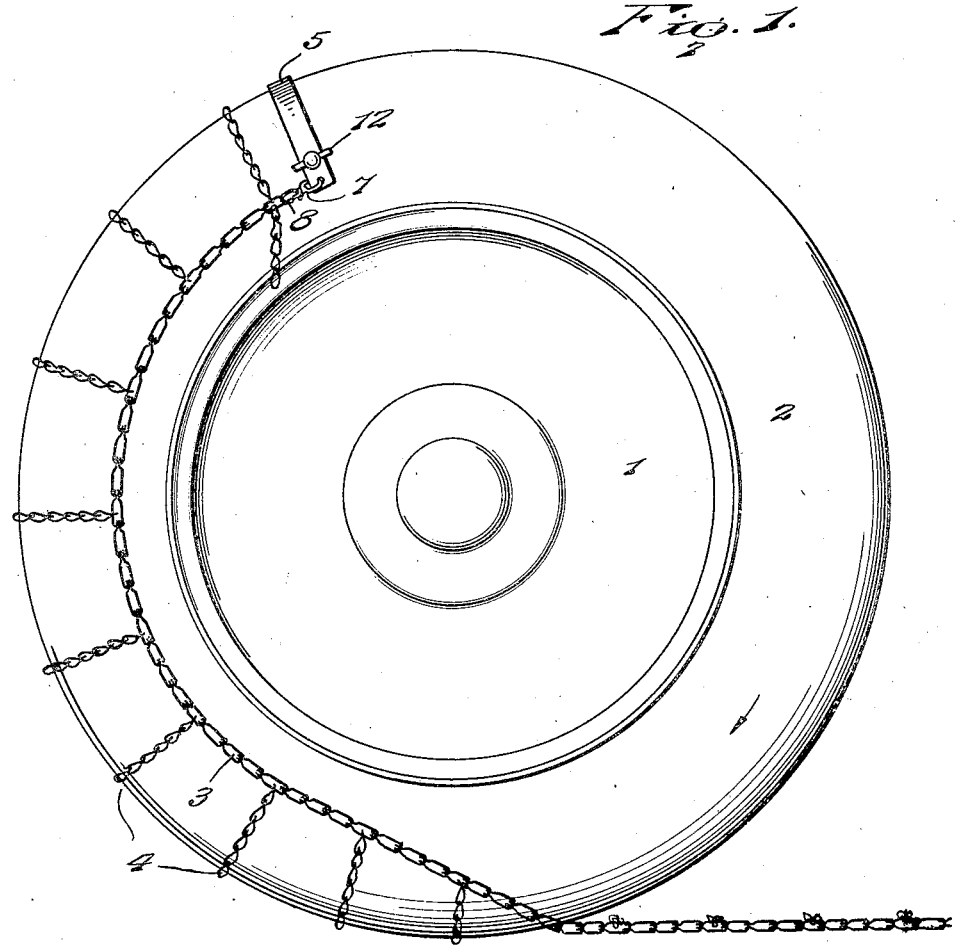
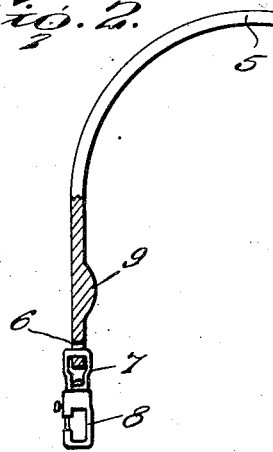
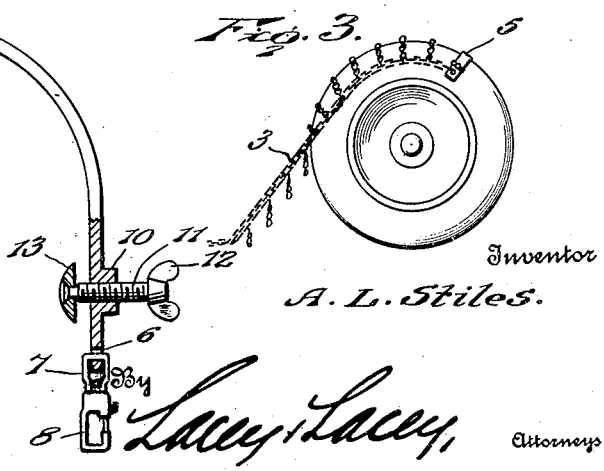
Inventor
A. L. Stiles.
By Lacey & Lacey,
Attorneys Patented June 20, 1933

1,914,760

UNITED STATES PATENT OFFICE

ALFRED L. STILES, OF BLUESTEM, WASHINGTON

TIRE CHAIN ATTACHMENT

Application filed July 7, 1932. Serial No. 621,247.

This invention is a device for facilitating the mounting of tire chains upon wheels. Various plans are followed at present in attaching tire chains to vehicle wheels, but, whatever method is pursued, difficulty is experienced in maintaining one end of the chain in proper relation to the wheel until the wheel has been entirely encircled by the chain. The present invention has for its object the provision of a simple and easily manipulated device by the use of which the application of the chain will be expedited and the end of the chain which is first fitted to the wheel will be firmly held in its proper position on the wheel until the wheel has been encircled and the ends of the chain brought together. The invention is illustrated in the accompanying drawing and will be hereinafter fully set forth.

In the drawing, Fig. 1 is a side elevation of a vehicle wheel showing the application of a chain and the device of the present invention thereto.

Fig. 2 is an enlarged elevation, partly in section, of the attachment constituting the present invention, Fig. 3 shows a variation.

The wheel 1 may be of any known type and is usually equipped with a pneumatic tire 2. In stormy weather, when the ground is covered with snow or ice, it is customary to apply to the wheel a tire chain consisting of longitudinal strands 3 which are disposed at the sides of the tire and cross strands 4 which span the tire and extend across the tread of the same at intervals. In carrying out the present invention, there is provided an arcuate base member 5 consisting of a strap of metal given the form of an arch whereby it may span a tire, as indicated in Fig. 1. This base member will be provided in various sizes so that the owner of an automobile or other vehicle desiring one of the devices may obtain it in the proper size to fit the tire of his vehicle. At the ends of the base member are provided openings 6 through which are engage links 7 having snap hooks 8 of any approved form swiveled thereto, as shown very clearly in Fig. 2. At one end of the base member there is provided, on its inner surface, a knob or projection 9 having a convex surface so that it may fit against the tire of the wheel without injuring the tire, and adjacent the opposite end of the base member, and in alinement with the said projection 9, is a boss 10 which has a threaded bore therethrough to receive a screw 11. The screw may be provided with any approved form of head, wings being indicated at 12 in the drawing, and the inner end of the screw is reduced in diameter and has a washer or gripping plate 13 swiveled thereon, said gripping plate having a convex inner surface which is presented to the side of the tire and cooperates with the convex projection 9 so that when the screw is turned home slightly the tire will be firmly gripped and the attachment held thereon.

When a chain is to be applied to a wheel, the chain may be spread along the garage floor or the surface of the ground, as will be understood upon reference to Fig. 1, and one end of the chain is then held to the wheel while the vehicle is driven over the chain and the wheel given approximately one-half a revolution, whereupon the portion of the chain remaining on the ground is lifted so as to be carried to and around the tire. Sometimes the vehicle is jacked up and one end of the chain is held to the wheel while the wheel is rotated to cause the chain to follow the rotation and encircle the tire, but, whichever method may be followed, difficulty has been experienced in holding the one end of the chain to the tire, as has been previously stated. Where my device is available, the screw 11 is withdrawn until the swiveled washer or clamping head 13 is close to the side of the base member. The base member is then applied over the tire, as shown in Fig. 1, and the hooks 8 are engaged in end links of the chain after which the screw 11 is turned home so as to exert a holding pressure upon the sides of the tire without puncturing or damaging the tire. If the wheel be then turned, the one end of the chain will be firmly held and the chain will be caused to follow the turning of the wheel so that the entire chain may be readily picked up and fit itself to the wheel and the ends brought close together. The end links of the chain may then be fastened without any difficulty so that the chain will be held on the wheel in use. The attachment or applying device is then disengaged from the chain and set aside. The device is obviously simple and inexpensive in construction and is highly efficient in use. Preferably, the devices will be furnished in pairs and will be suitably marked for application to the right or left wheels of the vehicle so that it will not be necessary to experimentally apply the device to a wheel in order to determine whether the proper attachment is applied. When the chain is removed from the wheel, it is desirable to immediately engage the proper attaching device with the chain so that they will be ready for instant use when again needed.

In Fig. 3 is indicated a method of applying the chain which may be preferred over the method shown in Fig. 1. In this arrangement, the attaching device is clamped to the wheel near the top thereof and the chain is attached so as to trail over and at the rear of the wheel. Then, if the wheel be rotated, the chain will be drawn onto and around it, as is obvious, and the wheel may be jacked up to facilitate the operation.

Having thus described the invention, I claim:

1. A tire-chain attaching device comprising an arcuate base member adapted to span a tire and provided at its ends with openings therethrough, a convex projection on the inner face of the base member at one side thereof, a clamping screw threaded through the base member at the other side thereof and provided with a swiveled convex head coacting with the convex projection to clamp a tire therebetween, links engaged in the openings at the ends of the base member, and chain-engaging hooks carried by said links.

2. A tire chain attaching device comprising an arcuate base member adapted to span a tire and provided on its inner side in spaced relation to one end thereof with a convex projection adapted to bear against the adjacent side of a tire, a clamping screw mounted in the base member in spaced relation to the opposite end thereof and disposed in transverse alinement with said projection, a convex presser head swiveled on the inner end of said screw, and chain engaging elements secured to the ends of the base member.

In testimony whereof I affix my signature.

ALFRED L. STILES. [L. S.]